(12) United States Patent
Büssert et al.

(10) Patent No.: US 7,904,400 B2
(45) Date of Patent: Mar. 8, 2011

(54) HELP SYSTEM WITH AN ONLINE HELP FACILITY AND AN OFFLINE HELP FACILITY, AN AUTOMATION DEVICE WITH SUCH A HELP SYSTEM AND A METHOD FOR PROVIDING HELP DATA

(75) Inventors: Jürgen Büssert, Igensdorf (DE); Jan Fischer, Nürnberg (DE); Rainer Heller, Eckental (DE); Harald Herberth, Oberasbach (DE); Ronald Lange, Fürth (DE); Stefan List, Fürth (DE); Franz-Josef Menzl, Greding (DE); Klaus Meusser, Fürth (DE); Michael Schlemper, Erlangen (DE); Michael Schlereth, Wilhermsdorf (DE); Bodo Stölzle, Karlsruhe (DE); Peter Wiedenberg, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 1484 days.

(21) Appl. No.: 10/540,284

(22) PCT Filed: Oct. 31, 2003

(86) PCT No.: PCT/DE03/03634
§ 371 (c)(1),
(2), (4) Date: Dec. 7, 2005

(87) PCT Pub. No.: WO2004/061709
PCT Pub. Date: Jul. 22, 2004

(65) Prior Publication Data
US 2006/0117315 A1 Jun. 1, 2006

(30) Foreign Application Priority Data
Dec. 20, 2002 (DE) .................. 102 60 250

(51) Int. Cl.
*G06F 3/048* (2006.01)
*G06F 15/18* (2006.01)
(52) U.S. Cl. .............................................. 706/45; 706/14
(58) Field of Classification Search ..................... 706/45
See application file for complete search history.

(56) References Cited

U.S. PATENT DOCUMENTS

| 4,992,972 A | * | 2/1991 | Brooks et al. .................. 715/708 |
| 7,200,614 B2 | * | 4/2007 | Reid et al. ............................. 1/1 |
| 2002/0054123 A1 | | 5/2002 | Walden et al. | |

FOREIGN PATENT DOCUMENTS
WO      WO 98/37503      8/1998

OTHER PUBLICATIONS

Espinoza, A World Wide Web Based Presentation System For An Adaptive Help System, Nov. 18, 1996.* D. Raggett et al.; "HTML 4.0 Specification, Chapter 17—Forms"; Apr. 24, 1998; pp. 219-250; XP-002306842.
Steve Wexler; "The Official Microsoft HTML Help Authoring Kit"; Feb. 1, 1998; pp. i-xii and 1-81; XP-002338710; Microsoft Press; Redmond, Washington.

* cited by examiner

*Primary Examiner* — Donald Sparks
*Assistant Examiner* — Nathan H Brown, Jr.

(57) ABSTRACT

A help system, an automation device with such a help system and a method for providing help data are disclosed. The help system includes a first offline help facility which is installed as part of an application on a data processing device, the first help facility providing a user with help data based upon context data defined by the user, the help data being stored in the first help facility and thus on the data processing device. A second online help facility is provided which is accessed by the data processing device via the internet such that the context data defined by the user in relation to the first help facility is automatically adopted in the second help facility as context data, the second help facility providing the user with additional help data based on this context data, the help data being stored in the second help facility.

19 Claims, 1 Drawing Sheet

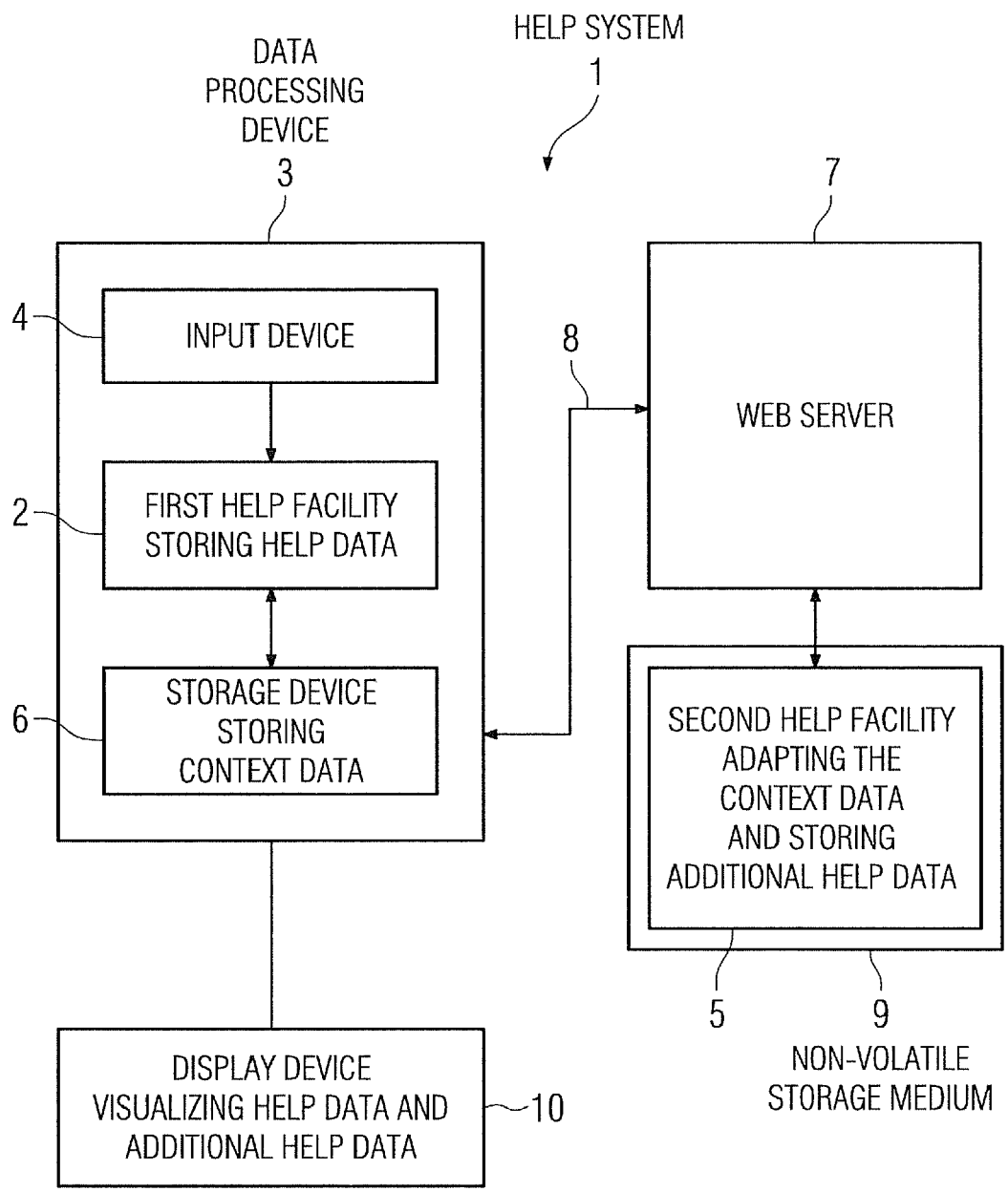

HELP SYSTEM WITH AN ONLINE HELP FACILITY AND AN OFFLINE HELP FACILITY, AN AUTOMATION DEVICE WITH SUCH A HELP SYSTEM AND A METHOD FOR PROVIDING HELP DATA

CROSS REFERENCE TO RELATED APPLICATIONS

This application is the US National Stage of International Application No. PCT/DE2003/003634, filed Oct. 31, 2003 and claims the benefit thereof. The International Application claims the benefits of German application No. 10260250.6 filed Dec. 20, 2002, both applications are incorporated by reference herein in their entirety.

FIELD OF THE INVENTION

The invention relates to a help system and a method for providing help data. The invention further relates to an automation device with a help system and a method for providing help data.

BACKGROUND OF THE INVENTION

Software, automation devices containing software and software for the programming and/or configuration of automation systems are becoming increasingly more complex for users. Help systems are provided to support the user whilst handling software and/or an automation device. Help systems of this type are typically a part of the software and are delivered together with the software. The software is installed with help systems of this type onto a data processing device, the help system then being locally available and/or on a network drive on this data processing device. The result is that the help data provided in a help system of this type is very static and is not updated until a new version of the software is installed. If on the other hand the user requires help data and/or information which is not contained in the help system delivered together with the software, the user must research databases provided via the internet for additional help data and/or information for example. The user must thus operate two different systems and search for help data separately in both systems.

It is known from the prior art that a help system delivered together with a software installed locally on a data processing device features branches or exits into the internet. The user is thereby able to branch onto a help system available online, starting from the help system installed locally on the data processing device and available offline. However help systems which are available online and offline are not integrated. This means that according to the prior art, the user only branches to a general start page of an individual predefined homepage of a help system available online. In this help system available online, the user must once again separately search for the necessary help data. This is extremely time-consuming.

When the term help data is used below, this should be understood to include all data required by the user to solve a concrete problem. This can be data which relates to the software as such. If the software is automation software for example which is installed in an automation device or is programmed or configured with said automation device, this help data can also be information about the automation environment. By way of example, data and/or information about components of the automation device can be provided as help data. Help data can thus be information provided from different data sources of the automation environment. Help systems of this type could thus also be referred to as information systems.

SUMMARY OF THE INVENTION

An object of the invention is to create an innovative help system, an innovative automation device with a help system and an innovative method for providing help data.

The object is solved by the independent claims.

The help system comprises a first help facility which is preferably installed as a part of an application on a data processing device, in which the first help facility provides a user with help data on the basis of context data defined by the user, in particular on the basis of search teens, said help data being stored in the first help facility and thus on the data processing device. The search terms are produced for example by the components used, current processing steps, the workflow, the current positioning in the first help facility and/or explicit search terms. The context data can be automatically deduced and be supplemented by the user if necessary. In accordance with the claimed invention, the help facility further comprises a second help facility stored on a non-volatile storage medium, the second help facility being accessed by the data processing device preferably via the internet such that the context data defined by the user in connection with the first help facility is automatically adopted in the second help facility as context data, in which the second help facility provides the user with additional help data based on this context data, said help data being stored in the second help facility. For the purpose of the invention, a static offline help facility, which is the first help facility, is rendered dynamic by means of a link with an online help facility being the second help facility. The adoption of the context data generated in connection with the offline help facility for the online help facility facilitates and accelerates the provision of the help data. A seamless integration of the second help facility into the first help facility is possible. Further, the additional online help data is visualized for the user in a display device together with the help data provided by the first help facility.

According to an advantageous embodiment of the invention, the additional help data provided by the second help facility is stored on the second help facility such that the additional help is supplemented by metadata, the metadata defining the context in which the respective additional help data is relevant. This allows additional help data to be located in a particularly simple and rapid manner.

Preferred developments of the invention are set down in the dependent claims and the description below.

A preferred exemplary embodiment of the invention is described in more detail below with reference to the drawing.

BRIEF DESCRIPTION OF THE DRAWING

FIG. 1 shows a simplified block diagram of the help system according to the invention.

DETAILED DESCRIPTION OF THE INVENTION

A help system according to the invention is described in detail below with reference to FIG. 1. FIG. 1 shows a help system 1, which comprises a first help facility 2, which is installed on a data processing device 3 as a part of a software and/or application. The first help facility 2 is thus a help facility which is delivered as part of a software together with the software and is installed on the data processing device 3. In the event that a user requires help data in order to answer a question or a problem which arises, the user enters search terms by means of an input device 4 for example in order to find help data in the first help facility 2. By doing this the user thus generates context data, said context data corresponding to the problem posed to the user, and which the user would like to solve by using the first help facility 2. One example could be the question regarding possible cycle times of an automation system. The context data is thereby covered by a current processing step (e.g. plugging in a component), the components used (e.g. identification of the component) and the inputting of further search functions (e.g. querying the cycle time).

The first help facility 2 which is installed on the data processing device 3 is an offline help facility. This is supplied together with a software and contains information which corresponds to the currency of the software and/or application installed on the data processing device 3.

For the purpose of the invention, a second help facility 5 is to be integrated into the help system 1 according to the invention, in addition to the first help facility 2. The second help facility 5 is stored on a non-volatile storage medium 9 and is configured as an online help facility and contains day-to-day information and/or help data. The data processing device 3, on which is installed the first help facility 2, accesses the second help facility 5 such that generated context data is automatically transferred as context data for the search in the second help facility 5 in connection with the first help facility 2. On the basis of this context data, the second help facility 5 provides the user and/or data processing device 3 with additional help data. Accordingly in the context of the invention, the context data generated in conjunction with the use of an offline help facility is automatically to be used for an extended search in an online help facility. The direct consequence is that the user of the help facility according to the invention must generate the context data only once, namely with use of an offline help facility 2, in an implicit or explicit manner. The context data defined in this way is automatically further used for the online help facility 5. The help facility 1 according to the invention is hereby made dynamic. In contrast to the static help systems according to the prior art which are self-contained, the present invention allows for the integration of further information sources. Up-to-the-minute help data and/or information can be integrated into the help system 1 according to the invention in a seamless manner.

The context data generated using the first help facility 2 is stored in a storage device 6 as so-called links, said storage device 6 being integrated in the data processing device 3. These links can also be referred to as extension links. The second help facility 5 can be activated via these links. The links use the context data and pass it on to the second help facility 5. The use of this context data allows additional help data to be determined in the second help facility 5, which the second help facility 5 transfers to the data processing device 3. The second help facility 5, that is the online help facility, is integrated into the first help facility 2, that is the offline help facility from the offline help facility.

It should be noted in relation to the context data, that the context data does not merely comprise the search terms, which were used by the user in connection with the first help facility 2, but also comprises additional data going beyond this facility. The context data thus also comprises data about the current version of the first help facility 2. Accordingly the version of the first help facility 2 must be identified for an efficient search in the second help facility 5. It is thus possible with the second help facility 5, namely the online help facility to implement a mapping of context subdata and to provide information suited to the real context.

The first help facility 2 and/or the data processing device 3, on which the first help facility 2 is installed, preferably accesses the second help facility 5 by way of an internet data connection. FIG. 1 shows a so-called Web server 7, which can be accessed by the data processing device 3 via an internet data connection 8 and which ultimately determines and compiles the additional help data in the second help facility 5.

The additional online help data provided by the second help facility 5, that is the online help facility, is visualized for the user in a display device 10 together with the offline help data provided by the first help facility, in other words the offline help facility. This allows the user to proceed in two different ways.

According to a first embodiment, the additional help data provided by the second help facility 5 is directly displayed. In this case, the Web server 7 provides the determined, additional help data directly for a display, for example in the form of documents or Web pages containing the corresponding additional help data. Finished or dynamically-generated pages can be provided here. The display device 10 assigned to the data processing device 3 and/or the first help facility 2 displays these pages directly.

According to a second alternative, the Web server 7 does not prepare the additional help data determined in the second help facility 5 for a display, but instead leaves the preparation of the additional help data to the first help facility 2 and/or the data processing device 3, on which the first help facility 2 is installed. The first help facility 2 can influence the manner in which the additional help data is to be displayed. In this case, the Web server 7 provides a so-called XML Web server for the transmission of the additional help data which was determined in the second help facility 5. The XML Web server provides XML Web services which supply the additional help data. The first help facility 2 defines the additional help information to be determined in the first help facility 2 by way of the context data on the one hand and on the other hand the mode in which the additional help data should be transmitted. The first help facility 2 thus uses the additional help data provided by the Web server 7 and prepares the data for display.

The additional help data can be determined on the second help facility 5 by a search being conducted for search terms based on the context data defined in connection with the first help facility 2. This is particularly useful if the determination of the additional help data requires a full-text search.

For the purpose of the present invention the additional help data provided by the second help facility 5 is stored on the second help facility 5 such that the additional help data is supplemented by metadata. The metadata specifies the context to which the help information belongs and/or the context for which help information is relevant. The metadata is thus preferably used to determine relevant, additional help data.

In this case, the context data which was generated in connection with the first help facility 2 is therefore used, in order to determine additional help data relevant to the respective context data, based on metadata which is used for the structured management and/or storage of the additional help data on the second help facility. The additional help data can thus originate from different data sources and areas of a company, for example production, production preparation, production planning, documentation or customer support. This additional help data is stored in a structured manner on the second help facility 5, in order to provide the second help data which originates accordingly from different data sources.

In this connection it is worth noting that it is also within the spirit of the present invention for additional help data to be stored in a structured manner on the second help facility 5 such that the storage of the additional help data conforms to the information requirements of a user, which results for example from the processing of a complex automation problem in the so-called workflow of the user. Certain help data is required by a user at different points in time. A user thus requires for example completely different help data at different phases of a design process. This can comprise documentation data, update data at specific components, marketing data, maintenance data or customer support data. Different data sources must be integrated in order to consider all the different help data.

It is thus within the spirit of the present invention to store the additional help data on the second help facility 5 in restructured or aligned form. The storage and/or preparation of the additional help data on the second help facility 5 are adapted accordingly to the workflow of the user and the problems resulting/arising from the workflow. The structured storage of the additional help data via the metadata takes into consideration the time at which the user requires the additional help data in the workflow. The storage of the additional help data is accordingly adapted to the requirements of the user in order to provide help data at the right point in time. A particularly fast and efficient provision of relevant, additional help data is possible here.

The additional help data is thus preferably provided and incorporated such that access is made to a Webserver 7 by way of the internet data connection 8, said Web server 7 determining the additional help data relevant in the second help facility 5 and delivering this to the data processing device 3 by means of the internet data connection 8, the first help facility 2 being installed on said data processing device. The provision and integration of the additional help data does nevertheless not necessarily have place via an internet data connection and/or Web server. The additional help data can also be available on a local computer, on which the data is stored. It is also possible to provide the additional help data on a storage medium, such as a CD or DVD for example and to dynamically integrate it into the first help facility 2. Furthermore it is possible for several Web servers 7 to be present, these being used to provide the additional help data.

Furthermore, it is within the spirit of the present invention to store and/or save the additional help data provided by the second help facility 5 in the storage device 6 of the data processing device 3. It is thereby possible to successively supplement the first help facility 2, i.e. the offline help facility, which is installed on the data processing device 3 by the additional help data which has been accessed. This type of additional help data which has thus been accessed once is also available offline. It is possible to characterize the additional help data stored subsequently on the data processing device 3 such that a user is able to recognize that on the one hand this is a case of help data stored subsequently and that it is possible to identify on the other hand at which point in time this additional help data was stored and from which data source it originated. This data is available offline and can be explicitly or implicitly tested for currency if a connection exists to the online help facility.

An additional aspect of the present invention is in the intermediate storage of the context data defined in connection with the first help facility 2 on the storage device 6. If for example the data processing device 2, which can be configured as a mobile laptop for instance, is used in surroundings in which no online access is available, the second help facility 5 can not be activated. The context data determined using the first help facility 2 is stored however in the storage device 6 so that if an online access is available once again, the additional help data is determined in the second help facility 5. If the data processing device 3 determines for example that an online access is available, it is thus within the spirit of the invention to preferably automatically activate the second help facility 5 and to use the context data intermediately stored in the storage device 6 to search for the relevant additional help data. A semi-automatic activation initiated by the user is also possible.

Within the spirit of the invention a help system is proposed which combines an offline help facility with an online help facility thereby providing for a dynamization of the offline help facility. The determination of additional help data in the online help facility is effected using context data which was generated by the user in connection with the offline help facility. In this way, additional relevant help data is explicitly searched in the online help facility without the user having to re-execute search steps. Instead, the search steps carried out in connection with the offline help facility and the context data generated thereby are also used automatically in the online help facility. This enables help data available later to be integrated seamlessly into the help system. In this way a simple update of the offline help facility is possible. The user does not have to switch between different applications during the search for relevant help data. The navigation in the different help facilities is adopted automatically by the help system according to the invention. An automatic, retrospective and dynamic expansion of the help system according to the invention is thereby possible by means of up-to-date help data.

The help system according to the invention can be used in different areas. It is thus suited in particular to use in the field of technical support and automation technology. It applies here to providing up-to-date current technical information and experience for technical issues and solution possibilities and to integrate them into the help system according to the invention. The most up-to-date specific help data is then transmitted to the user. Furthermore, the use of the help system according to the invention provides so-called presales information. Help data also exists in the presales area which can be made available to the user in a context-dependent manner. Slides, brochures, product data bases, short descriptions and or parts of this document can be known as examples of help data of this type. The invention can also be used in the area of the product marketing.

It is also possible to provide help data in a user-dependent manner. Thus, special user groups are defined with the help of metadata, by means of which the additional help data is stored in the second storage device 5 in a structured manner. Other help data is significant for a manager for example, as for a commissioning engineer, maintenance engineer or programmer. The additional help data can be made available not only in a context-dependent manner, but also on a role-dependent basis.

The invention comprises further advantageous embodiments regarding a method:

The additional help data provided by the second help facility (5) is stored on the second help facility (5) such that, the additional help data is supplemented by metadata, the metadata defining the context in which the respective additional help data is relevant.

The additional help data is stored in the second help facility (5) in a structured manner according to the workflow of the user, such that with the determination of additional help data, help data only required for the current processing step is necessary.

The context data is compiled by the first help facility (2) from several different data sources and/or information sources.

The workflow and/or a user role are used to determine the offline help data and the online help data.

LIST OF REFERENCE CHARACTERS 01 help system
02 first help facility
03 data processing device
04 input device
05 second help facility
06 storage device
07 Web server
08 internet data connection

The invention claimed is:

1. A help system comprising: a data processing device storing a first help facility, wherein the first help facility provides help data to a user on the basis of context data produced implicitly or explicitly by the user, wherein the help data is stored in the first help facility; and
a non-volatile storage medium storing a second help facility accessed by the data processing device via the Internet such that the context data is adopted automatically in the second help facility, wherein the second help facility provides additional online help data to the user on the basis of the context data, wherein the additional online help data is stored in the second help facility,
wherein the additional online help data is visualized for the user in a display device together with the help data provided by the first help facility,
wherein the first help facility is configured as an offline help facility and the second help facility is configured as an online help facility, and
wherein the context data comprises data and/or information about the version of the first help facility.

2. The help system according to claim 1, wherein the first help facility is an application or a part of an application.

3. The help system according to claim 1, wherein the context data are determined on the basis of search terms.

4. The help system according to claim 1, wherein the context data comprises data defined explicitly by the user, search expressions, and data predetermined by the first help facility which can be implicitly derived from a current workflow.

5. The help system according to claim 1, wherein the additional online help data provided by the second help facility can be visualized for the user in a display device, together with the offline help data provided by the first help facility.

6. The help system according to claim 1, wherein the context data defined by the user using the first help facility is stored at least as a link and the second help facility can be automatically activated via said link or any link.

7. The help system according to claim 6, wherein the link or any link can then automatically activate the second help facility, when the second help facility is available online for the first help facility and thus for the data processing device, whereby if the second help facility is not available online, said link or any link and/or its context data is intermediately stored until the second help facility is available online.

8. The help system according to claim 1, wherein the additional help data provided by the second help facility is stored on the second help facility such that the additional help data is supplemented by metadata, the metadata defining the context in which the respective additional help data is relevant.

9. The help system according to claim 1, wherein help data stored on the first help facility is automatically supplemented such that the additional help data provided by the second help facility is stored in the first help facility.

10. The help system according to claim 1, wherein the additional help data is stored in the second help facility and structured according to the workflow of the user, such that when additional help data is determined, help data is provided only for a current processing step.

11. An automation device, comprising:
a help system, the help system comprising:
a data processing device storing a first help facility, wherein the first help facility provides help data to a user on the basis of context data produced implicitly or explicitly by the user, wherein the help data is stored in the first help facility; and
a non-volatile medium storing a second help facility accessed by the data processing device via the Internet such that the context data is adopted automatically in the second help facility, wherein the second help facility provides additional online help data to the user on the basis of the context data, wherein the additional online help data is stored in the second help facility,
wherein the additional online help data is visualized for the user in a display device together with the help data provided by the first help facility,
wherein the first help facility is configured as an offline help facility and the second help facility is configured as an online help facility, and
wherein the context data comprises data and/or information about the version of the first help facility.

12. A method for providing help data, the method comprising:
implicitly or explicitly defining context data regarding a first help facility by a user;
providing offline help data to the user, the offline help data being based on the context data, and wherein the offline help data is stored in the first help facility;
automatically adopting the context data in a second help facility;
providing additional online help data to the user based on the context data by the second help facility, wherein the additional online help data is stored in the second help facility,
wherein the additional online help data provided by the second help facility is visualized for the user in a display device, together with the offline help data provided by the first help facility,
wherein the context data is stored as at least one link, and the second help facility is automatically activated via said link or any link, and
wherein the context data comprises data and/or information about the version of the first help facility.

13. The method according to claim 12, wherein the context data are determined on the basis of search terms.

14. The method according to claim 12, wherein the context data comprises data explicitly defined by the user and data predetermined by the first help facility, wherein the data are derived implicitly from a current workflow.

15. The method according to claim 12, wherein the link or any link then automatically activates the second help facility, if the second help facility is available online for the first help facility and thus for the data processing device, whereby if the second help facility is not available online, the link or any link and/or its context data is stored until the second help facility is available online.

16. The method according to claim 12, wherein the additional help data provided by the second help facility is stored on the second help facility such that the additional help data is supplemented by metadata, the metadata defining the context in which the respective additional help data is relevant.

17. The method according to claim 12, wherein the additional help data is stored in the second help facility in a structured manner according to a workflow of the user such that, with a determination of additional help data, help data only required for the current processing step is necessary.

18. The method according to claim 17, wherein the workflow and/or user role are used to determine the offline help data and the online help data.

19. The method according to claim 12, wherein the context data is compiled by the first help facility from several different data sources and/or information sources.

* * * * *